(12) United States Patent
Mueter et al.

(10) Patent No.: US 10,115,026 B2
(45) Date of Patent: Oct. 30, 2018

(54) METHOD FOR LANE DETECTION

(71) Applicant: DELPHI TECHNOLOGIES, INC., Troy, MI (US)

(72) Inventors: Mirko Mueter, Erkrath (DE); Kun Zhao, Dulsburg (DE); Lech J. Szumilas, Palo Alto, CA (US); Dennis Mueller, Moers (DE); Christian Nunn, Huckeswagen (DE)

(73) Assignee: Delphi Technologies, Inc., Troy, MI (US)

( * ) Notice: Subject to any disclaimer, the term of this patent is extended or adjusted under 35 U.S.C. 154(b) by 156 days.

(21) Appl. No.: 15/303,385

(22) PCT Filed: Mar. 27, 2015

(86) PCT No.: PCT/EP2015/056717
§ 371 (c)(1),
(2) Date: Nov. 7, 2016

(87) PCT Pub. No.: WO2015/150256
PCT Pub. Date: Oct. 8, 2015

(65) Prior Publication Data
US 2017/0068862 A1    Mar. 9, 2017

(30) Foreign Application Priority Data
Apr. 4, 2014    (EP) .................................... 14163567

(51) Int. Cl.
*G06K 9/00* (2006.01)
*G06T 7/20* (2017.01)
*H04N 7/18* (2006.01)

(52) U.S. Cl.
CPC .......... *G06K 9/00798* (2013.01); *G06T 7/208* (2013.01); *H04N 7/181* (2013.01)

(58) Field of Classification Search
CPC ............ G06K 9/00798; G06K 9/4609; G06K 9/4604; H04N 7/181
(Continued)

(56) References Cited

U.S. PATENT DOCUMENTS 6,819,779 B1* 11/2004 Nichani ............. G06K 9/00798
                                                         382/104
6,823,241 B2* 11/2004 Shirato ................ G06K 9/4609
                                                         701/1

(Continued)

OTHER PUBLICATIONS

Kun Zhao et al: "A novel multi-lane detection and tracking system", Intelligent Vehicles Symposium (IV), 2012 IEEE, IEEE, Jun. 3, 2012 (Jun. 3, 2012), pp. 1084-1089, XP032452959, DOI: 10.1109/IVS.2012.6232168 ISBN: 978-1-4673-2119-8 cited in the application the whole document.

(Continued)

*Primary Examiner* — Thai Tran
*Assistant Examiner* — Jose Mesa
(74) *Attorney, Agent, or Firm* — Lawrence D. Hazette

(57) ABSTRACT

A method for lane detection for a camera-based driver assistance system includes the following steps: image regions in images that are recorded by a camera are identified as detected lane markings if the image regions meet a specified detection criterion. At least two detected lane markings are subjected to a tracking process as lane markings to be tracked. By means of a recursive state estimator, separate progressions are estimated for at least two of the lane markings to be tracked. Furthermore, for each of a plurality of the detected lane markings, a particular offset value is determined, which indicates a transverse offset of the detected lane marking in relation to a reference axis. By means of an additional estimation method, the determined offset values are each associated with one of the separate progressions of the lane markings to be tracked.

13 Claims, 3 Drawing Sheets

(58) Field of Classification Search
USPC .......................................................... 348/148
See application file for complete search history.

(56) References Cited

U.S. PATENT DOCUMENTS

| | | | | |
|---|---|---|---|---|
| 2008/0270018 | A1* | 10/2008 | Citelli | B60K 31/0008 |
| | | | | 701/532 |
| 2012/0033074 | A1* | 2/2012 | Spangenberg | G06K 9/00798 |
| | | | | 348/148 |
| 2016/0203374 | A1* | 7/2016 | Zeng | G01S 13/726 |
| | | | | 382/104 |

OTHER PUBLICATIONS

Leng, et al: "A new multi-lanes detection using multi-camera for robust vehicle location", Intelligent Vehicles Symposium, 2005. Proceedigns. IEEE Las Vegal, NV, USA Jun. 6-8, 2005, Piscataway, NJ, USA, Jun. 6, 2005 (Jun. 6, 2005), pp. 700-705, XPO10833877, ISBN: 978-0-7803-8961-8 pp. 701-703.

Albert S Huang et al: "Probabilistic lane estimation for autonomous driving using basis curves", Autonomous Robots, Kluwer Academic Publishers, BO, vol. 31, No. 2-3, Sep. 2011 (Sep. 2011), pp. 269-283, XPO19949717, ISSN: 1573-7527, DOI: 10.1007/S10515-011-9251-2 the whole document.

Mirko Meuter et al: "A novel approach to lane detection and tracking", Intelligent Trnasportation Systems, 2009. ITSC '09. 12th International IEEE Conference On, IEEE, Piscataway, NJ, USA, Oct. 4, 2009 (Oct. 4, 2009), pp. 106, XPO31560119, ISBN: 978-1-4244-5519-5 cited in the application pp. 582-585.

Christopher M Bishop: "Graphical Models" In: "Pattern Recognition and Machine Learning", 2006, Springer, XP055191714, pp. 359-422, p. 382, lines 1-4.

* cited by examiner

METHOD FOR LANE DETECTION

CROSS-REFERENCE TO RELATED APPLICATION

This application claims the benefit under 35 U.S.C. § 371 of published PCT Patent Application Number PCT/EP 2015/056717, filed Mar. 27, 2015 that claims priority to European Patent Application 14163567 filed Apr. 14, 2014, and published as WO2015/150256 on Oct. 8, 2015, the entire contents of which is hereby incorporated by reference herein.

TECHNICAL FIELD OF INVENTION

This disclosure generally relates to a method for lane detection for a camera-based driver assistance system having a camera attached to a vehicle for capturing images of a traffic space ahead of the vehicle, comprising the steps that in images captured by the camera that areas of the image are identified as recognized lane markings which meet a predetermined recognition criterion, and at least two recognized lane markings are subjected to a tracking process as lane markings to be tracked, wherein the temporal change of the course of the at least two lane markings to be tracked in the road surface plane is tracked by means of a common recursive state estimator, such as an extended Kalman filter.

BACKGROUND OF INVENTION

In a method of the aforementioned type, such objects are detected in a camera image which may constitute lane markings, by means of known image processing techniques. These recognized lane markings may be as well objects similar to markings such as guardrails, tar seams, and sides of the road. Therefore, preferably not all detected objects are tracked by means of tracking, but only a subset of said objects which were classified as "real" lane markings on the basis, for example, of additional sensor inputs or image processing techniques. In many applications it is sufficient to recognize the so-called own-lane on which the vehicle is currently travelling, and thus to include in the tracking only a left and a right limit marking of said own-lane. During the tracking, the local position and the local slope of model curves approximately describing the lane markings are predicted for a future point of time and adjusted with subsequent detections.

Recursive state estimators here generally serve the approximate projection of a system state into the future and are generally known in the art. Specifically, a state estimator used in the inventive method has a predictor-corrector structure.

The tracking of a left and a right lane marking by a single state estimator can be performed, for example, assuming that lane markings ahead of a vehicle are parallel to each other—which is the case in many actual traffic situations. Such a tracking process may reach a high degree of robustness, since the individual lane markings stabilize each other to some extent. However, there are traffic situations in which not all lane markings are parallel to each other, e.g. in existing turnoffs. In such situations, the model on which tracking is based cannot be brought in line with reality and the tracking algorithm fails. This may significantly reduce the performance of a driver assistance system, and is not acceptable particularly in autonomous vehicles.

SUMMARY OF THE INVENTION

To deal with the problem of lane markings in reality sometimes not parallel to each other, in principle, two or more recognized lane markings could be subjected to a separate tracking process. Such a method for lane detection, also called "multi target tracking", is disclosed in the article by Kun Zhao et al: "A Novel Multi-lane Detection and Tracking System", Intelligent Vehicles Symposium (IV), 2012, IEEE, Jun. 3, 2012, pages 1084-1089, XP032452959, DOI: 10.1109/IVS.2012.6232168, ISBN: 978-1-4673-2119-8.

Since no special constraints have to be met, the method promises a high degree of flexibility. Since the individually tracked objects do not stabilize each other, the realizable degree of robustness is comparatively small. In addition, the independent tracking of several objects requires a large computational effort.

Therefore, the present invention is based on the object to provide a method of the aforementioned type, which allows for robust lane detection with comparatively low computational effort, and delivers reliable results, in particular in complex or unusual traffic situations, such as construction sites. This object is solved by a method having the features of claim 1.

According to the invention, it is provided that by means of the state estimator, separate courses are estimated for at least two of the lane markings to be tracked, a respective offset value is determined for several of the recognized lane markings, which indicates a transversal offset of the recognized lane marking relative to a reference axis parallel to a center longitudinal axis of the vehicle, and by means of an additional estimation method, an allocation of the determined offset values to a respective one of the separate courses of the lane markings to be tracked is performed.

The offset values can be determined directly from the image data as part of the identification. An offset value indicates the axis section of a function approximately describing the relevant lane marking on the y-axis running transversely to the vehicle. In the context of the invention, the offset values are each associated with one of the separate courses. This gives the possibility to allow several independent course hypotheses and yet exploit the parallelism of the lane markings mostly given in practice for stabilization of the algorithm. Thus, the tracking can be made more robust. In particular, complex traffic situations can be handled safely. In comparison to "multi target tracking" which requires for example the simultaneous use of several Kalman filters, the computational effort is only small.

Preferably, separate courses are estimated for exactly two of the lane markings to be tracked, wherein the allocation of the determined offset values to a respective one of the two separate courses is indicated by a set of binary parameters. The tracking of only two lane markings corresponding to a left and a right lane boundary is as mentioned generally sufficient for recognition of the own-lane. In the presence of only two separate courses, each individual allocation of an offset value to one of the courses can be fully characterized by a binary parameter or an indicator variable. Specifically, it may be determined that a binary parameter with a value of 1 indicates that the relevant offset value is allocated to the first of the separate courses, whereas a binary parameter with a value of 0 indicates that the offset value is allocated to the other course. Accordingly, for each of the—optionally numbered—offset values, a separate binary parameter can be defined whose value indicates one of the separate courses. In this way, the allocation between the offset values and the courses can be handled mathematically. For example, the values of the binary parameters can be taken as variable in time and can be estimated together with the separate courses—preferably also together with the offset values to be determined themselves.

The set of binary parameters can be used in particular for parameterization of a model curve approximately describing the course of the lane, such as a clothoid. Specifically, the model curve can be indicated as sum of two course terms and an offset value, wherein one of the course terms has to be multiplied with the binary parameter itself and the other course term with the difference between 1 and the binary parameter. Depending on the value of the binary parameter, either only the first course term or only the second course term is then combined with the respective offset value.

According to an embodiment of the invention, it is provided that given combinations of values of the set of binary parameters are used as input variables for generating additional estimation hypotheses. The allocation of the offset values to individual courses can thus be made available for a mathematical estimation process.

In particular, this may be provided in that the tracking process is performed separately for several different, preferably for all possible, hypotheses and that by means of the additional estimation method, for example following a predetermined number of computing cycles, a most likely hypothesis is determined for which the deviation between the estimated courses of lane markings to be tracked and the courses of recognized lane markings is lowest. Therefore, to determine the best allocation, simply all possible allocations are tried to determine with which allocation the observations are best explained. It has been found that in this manner the optimum allocation can be found in a relatively short period of time.

Preferably, only two tracking processes for different hypotheses are performed simultaneously in single comparison steps, respectively. This allows distributing the entire computational effort over time to keep the power requirements for the associated computer system low.

According to an embodiment of the invention, it is provided that starting with an arbitrary start hypothesis several single comparison steps are carried out successively, wherein the most likely hypothesis of a previous single comparison step is respectively compared with a hypothesis not yet subjected to a single comparison step. By means of such an approach, the global optimum can be found at low computational effort, wherein improbable hypotheses are successively eliminated.

According to a further embodiment of the invention, it is provided that for every generated hypothesis a separate allocation of measurement values to the lane markings is performed using the Hungarian method. In this way, the measurement values or observations can be allocated to the individual markings particularly effective. As an alternative to the Hungarian method, a JPDA method ("Joint Probabilistic Data Association" method) may also be applied.

For allocation of the determined offset values to a respective one of the separate courses of the lane markings to be tracked, a parametric estimation method, in particular a maximum likelihood method, can be applied. In principle, a method based one on an interacting multiple model filter (IMM filter) could also be applied.

According to another embodiment of the invention, respective offset values are determined for at least three and preferably for at least four recognized lane markings. It has been found that in general in determining only two offset values, the estimated effort for the additional estimation method is not worthwhile.

It may further be provided that a test is made before performing the additional estimation method, if for each separately estimated course at least one or two offset values are determinable, wherein otherwise the state estimator is limited by means of a logic based on the number of offset values. This reflects the fact that there are situations in which only one offset value per course can be determined since for example only two lane markings are recognizable in the camera image. In such situations, the stability of the method can be ensured with a partial shutdown of the state estimator.

The state estimator may use a state vector whose components comprise course parameters for each of the lane markings to be tracked and additionally several offset parameters formed by the offset values. In particular, slopes, curves, or curve changes describing the model curve can form components of the state vector. When using a 3rd degree polynomial as a model curve, the coefficients of the linear, quadratic, and cubic term can form the course parameters, for example. Thus, the separate courses and the offset values—virtually the curve shape on one hand and the curve position on the other hand—may be subjected to a common estimation method wherein only one state estimator needs to be handled.

Furthermore, the state estimator can use a state vector whose components additionally include an angular offset of the vehicle relative to one of the two separate courses, an angular offset of the vehicle relative to the other of the two separate courses, an angle of inclination of the road surface plane relative to an average road surface plane and/or a lateral speed of the vehicle. In this way, the corresponding model curve can be adjusted relatively exactly to an actual lane marking.

It may be provided that the reference axis coincides with the center longitudinal axis of the vehicle or with its vertical projection on the road surface plane and the offset values each indicate a transverse offset of a lane marking in the road surface plane. Such definition of the reference axis simplifies the calculations and the corresponding programming.

Preferably, only those two lane markings are subjected to the tracking process which correspond to a left and a right lane boundary of the own-lane driven on by the vehicle. This is sufficient for a reliable detection of the own-lane and allows for limiting the number of parameters to be estimated.

The invention also relates to a vehicle with a camera aligned in the driving direction for capturing images of a traffic space ahead of the vehicle and a unit for evaluating the images captured by the camera, wherein the evaluation unit is configured to perform a method as described above.

Advantageous embodiments of the invention may also be taken from the dependent claims, the drawings, and the associated description.

BRIEF DESCRIPTION OF DRAWINGS

The invention will now be described by way of example with reference to the accompanying figures.

DETAILED DESCRIPTION

Figure 1:
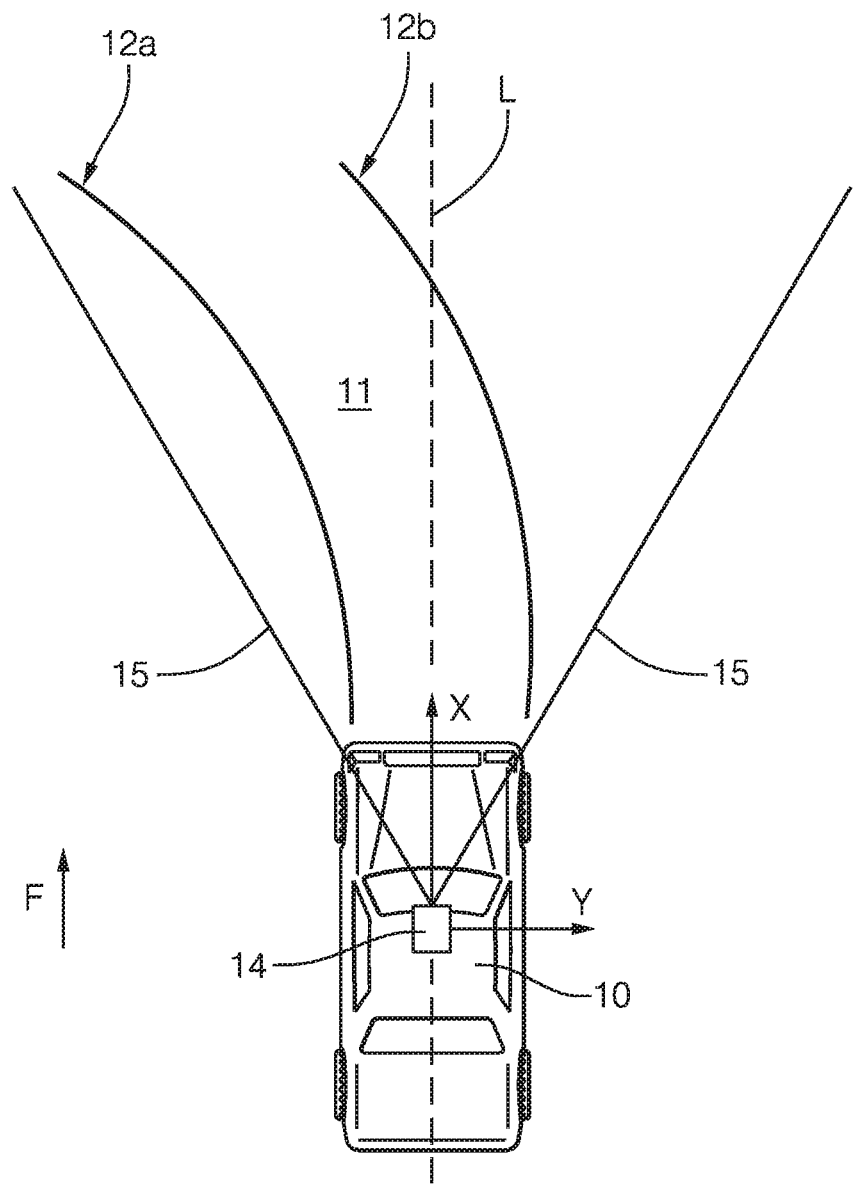
FIG. 1 shows a plan view of a traffic space with a motor vehicle comprising an inventive device for lane detection.
Figure 2:
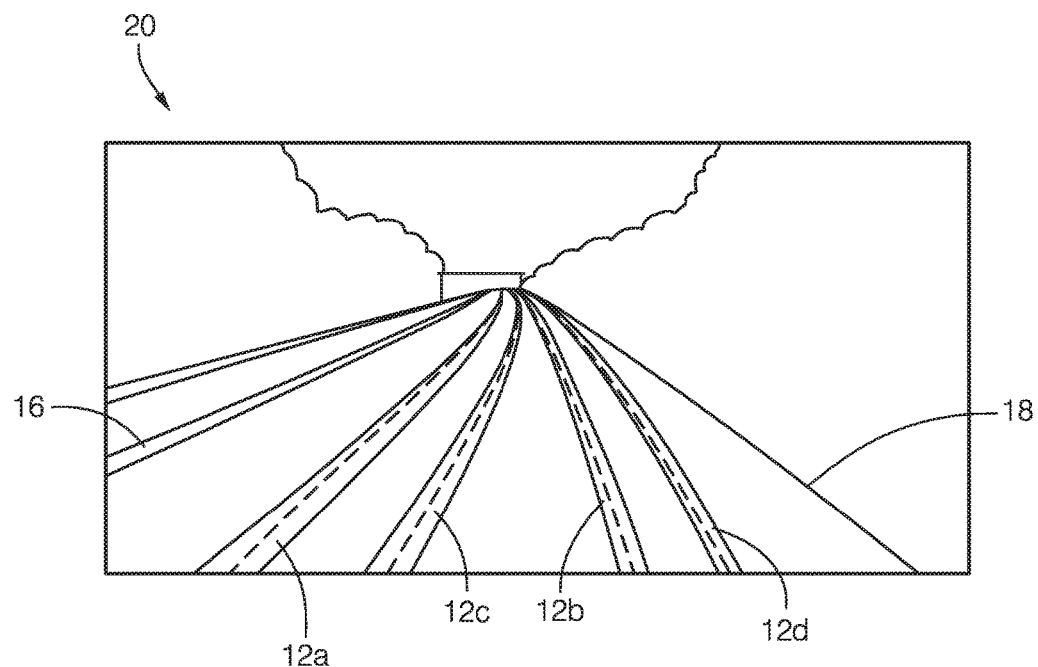
FIG. 2 shows an exemplary image, which was captured by an image capturing device arranged on the vehicle according to FIG. 1.

According to FIG. 1, a motor vehicle 10 is traveling on an own-lane 11 of a road in a driving direction F. The own-lane 11 is limited by a left lane marking 12a and a right lane marking 12b—by way of example, each in the form of a solid line. In a front area of the vehicle headliner, a camera 14 is mounted which continuously captures an image of the traffic space ahead of the motor vehicle 10, as shown by the lines of sight 15. The camera position spans the world coordinate system x, y. Furthermore, the camera 14 is coupled to a downstream image processing computer which is not shown in FIG. 1. An example of an image 20 of the traffic space ahead of the motor vehicle 10 captured by the camera 14 is shown in simplified form in FIG. 2.

The camera 14 and the associated image processing computer are part of a driver assistance system, for example, a system for supporting lane holding (lane departure warning system, LDW). Said system detects and tracks lane markings based on the images captured by the camera 14 at regular intervals, as is explained in more detail below.

All potential lane markings 12a, 12b, 12c, 12d, 16, 18 are extracted in a captured image 20 by means of suitable image processing algorithms known in the art, i.e. those areas of the image are identified as recognized lane markings which meet a predetermined recognition criterion for lane markings. This process is preferably carried out in segments, i.e. based on individual sections of a line. The thus recognized lane markings can be the above-mentioned left and right lane marking 12a, 12b, further lane markings 12c, 12d, or guardrails 16 or sides of the road 18. In the situation shown, there is a lane change from left to right specified by the markings due to a construction site, so the lane markings 12a, 12b as shown compete with the lane markings 12c, 12d.

The left and the right lane marking 12a, 12b are subjected to a tracking process as lane markings to be tracked, wherein the temporal change of the course of the lane markings 12a, 12b in the road surface plane is tracked separately by means of a common state estimator.

Figure 3:
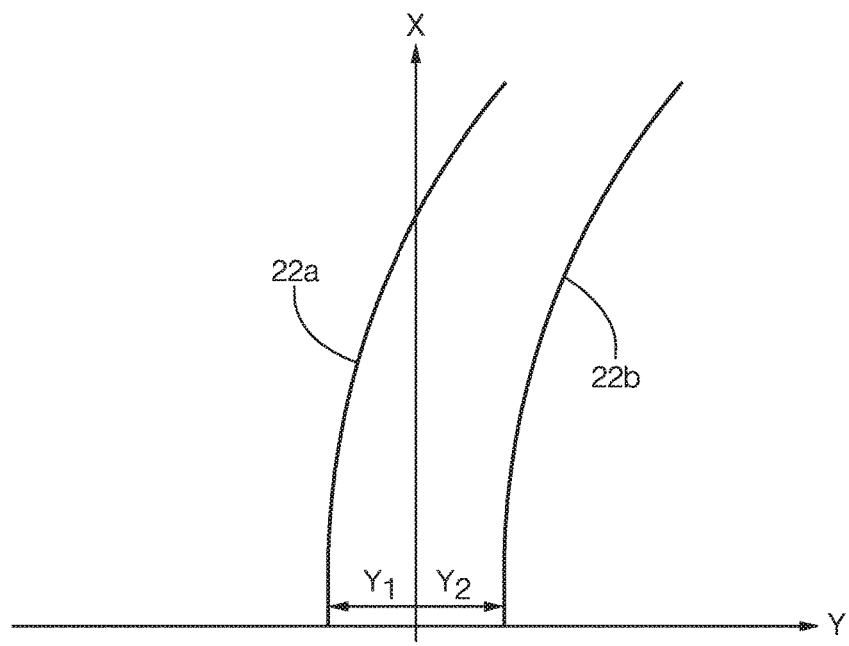
FIG. 3 shows two model curves approximately describing the course of a left lane marking and a right lane marking.

In the described embodiment of the invention, 3rd degree polynomials are used as model curves for the lane markings in world coordinates, comprising respective coefficients for a cubic, a square and a linear term, as well as an offset value as an absolute term. However, other types of model curves may be used. In FIG. 3, exemplary model curves 22a, 22b are shown in the road surface plane.

For each recognized lane marking 12a, 12b, 12c, 12d, and optionally verified by a classifier, an offset value yi may be specified indicating the y-axis section, i.e. a transverse offset of the recognized lane marking 12a, 12b, 12c, 12d relative to the x-axis, which here is parallel to the center longitudinal axis L (FIG. 1) of the motor vehicle 10.

The actual tracking, i.e. the tracking of the temporal change of the course of the two lane markings 12a, 12b to be tracked, is preferably performed by a separate module and by means of a state estimator, which is based on an Extended Kalman filter. Specifically, the tracking may be performed according to the principles which are described in the paper "A Novel Approach to Lane Detection and Tracking" by M. Meuter et al., Proc. IEEE Conference on Intelligent Transportation Systems, St. Louis, USA, Oct. 3-7, 2009, pages 582-587.

Using the Extended Kalman filter, two course hypotheses and four offset values are tracked simultaneously in the embodiment described herein. The state vector x describing the system state is hereby given by Eq. 1:

$$x = [c11\ c10\ \beta1\ c21\ c20\ \beta2\ y1\ y2\ y3\ y4\ \gamma\ v] \qquad \text{Eq. 1,}$$

wherein c11 and c10 are changes in curvature of the first course, $\beta1$ is the offset angle of the vehicle 14 relative to the first course, c21 and c20 are changes in curvature of the second course, $\beta2$ is the offset angle of the vehicle 14 relative to the second course, y1-y4 are offset values, $\gamma$ is the inclination angle of the road surface plane relative to an average road surface plane and v is the lateral speed of the vehicle 14.

The system state is therefore represented by two separate courses for the left and the right lane marking 12a, 12b and additionally by four offset values y1-y4. The offset values y1-y4 are each allocated to one of the two courses, respectively. An additional estimation method, which is based on a maximum likelihood approach, not belonging to the state estimator, decides which offset value is allocated to which course.

To be able to perform the estimation method, the allocation of the four offset values y1-y4 to each respective one of the two separate courses is indicated by a set of binary parameters m1-m4, which are combined into an allocation vector m (Eq. 2):

$$m = [m1\ m2\ m3\ m4] \qquad \text{Eq. 2.}$$

A value of 0 for a binary parameter with the index i indicates that the offset value with the index i belongs to the first course, while a value of 1 for the same binary parameter indicates that the respective offset value belongs to the second course. A value of [0 0 0 1] for the vector m therefore indicates that the offset values y1-y3 belong to the first course and the offset value y4 belongs to the second course. The model curve is given by Eq. 3:

$$f_i(x_t, l) = \begin{bmatrix} l \\ (1-m_i) \cdot \left(\frac{1}{6}c_{11}l^3 + \frac{1}{2}c_{10}l^2 + \beta_1 l\right) + \\ m_i \cdot \left(\frac{1}{6}c_{21}l^3 + \frac{1}{2}c_{20}l^2 + \beta_2 l\right) + y_i \\ y_l \end{bmatrix} \qquad \text{Eq. 3}$$

With the additional estimation method, predetermined allocation vectors m are treated as hypotheses. The tracking process is then performed separately for all possible hypotheses, wherein after a predetermined number of computing cycles that hypothesis is determined for which the deviation between the estimated model curves and the measurements, i.e. recognitions, is lowest. Said hypothesis is classified as "most probable hypothesis". To distribute the computational effort over time, single comparison steps are carried out successively, within which two tracking processes for different hypotheses are performed simultaneously at a time.

Figure 4:
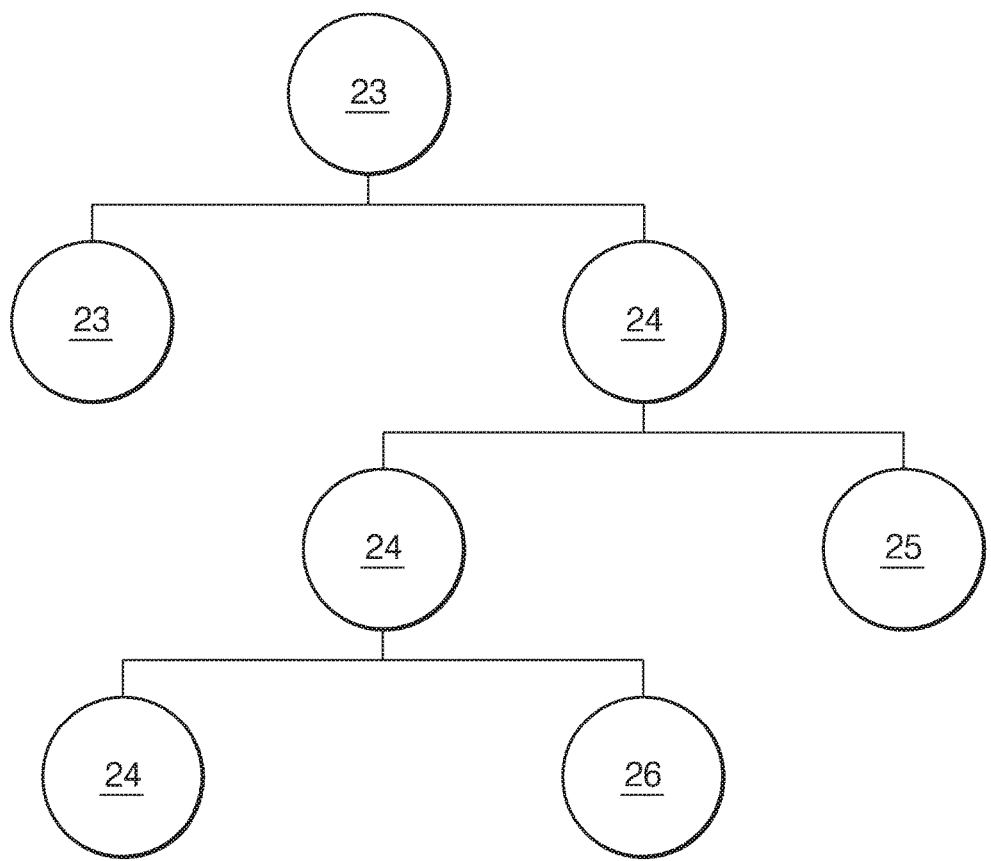
FIG. 4 schematically shows the flow of an estimation method to determine an optimal allocation of offset values to each of two separate courses of lane markings, respectively.

As shown in FIG. 4, in principle the start is with an arbitrary start hypothesis 23, e.g. m=[0 0 0 0]. Said start hypothesis 23 is compared to a first comparison hypothesis 24, e.g. m=[1 0 0 0]. If it is found in the context of tracking that the first comparison hypothesis 24 is more likely than the start hypothesis 23, as in the example shown, the first comparison hypothesis 24 is used as new base hypothesis, while the start hypothesis 23 is discarded. The first comparison hypothesis 24 is then compared with a second comparison hypothesis 25, e.g. m=[1 1 0 0], which has not yet been tested. In the example shown, again the first comparison hypothesis 24 prevails. In the next step, it is then compared with a third hypothesis 26, e.g. m=[1 0 1 0]. Accordingly, further single comparison steps follow, not shown. In this way, all possible hypotheses are tested, wherein improbable hypotheses are gradually sorted out until only the most likely hypothesis remains. This hypothesis is used for subsequent tracking as an optimum allocation between offset values and courses.

The prediction of the state on the basis of appropriate motion and measurement functions as well as converting between world coordinates and image coordinates may be performed in a basically known manner—e.g. as described in the above paper. Usually a non-linear function h is used to relate a point xt on the lane marking to observations yt in the image plane (Eq. 4):

$$yt = h(fi(xt,l)) \qquad \text{Eq. 4.}$$

Prior to performing the additional estimation method, it is tested if for each separately estimated course at least one or two offset values can be determined. If this is not the case, parts of the state estimator will be deactivated by means of a suitable logic.

The invention enables robust lane detection even in complex traffic situations like city traffic situations or construction site situations, wherein the tracking process remains stable even at existing turnoffs or conjunctions of lane markings.

The invention claimed is:

1. A method for lane detection for a camera-based driver assistance system comprising a camera attached to a vehicle for capturing images of a traffic space ahead of the vehicle, wherein the method includes:
   a) identifying in an image captured by a camera that areas of the image are identified as recognized lane markings which meet a predetermined recognition criterion;
   b) tracking at least two recognized lane markings, wherein a temporal change of a course of the at least two lane markings to be tracked in the road surface plane is tracked using a common recursive state estimator,
   c) estimating separate courses for the at least two of the lane markings to be tracked;
   d) determining a respective offset value for the at least two recognized lane markings, wherein said respective offset value indicates a transversal offset of the at least two recognized lane markings relative to a reference axis parallel to a center longitudinal axis of the vehicle; and
   e) performing an allocation of the respective offset value to a respective one of the separate courses of the lane markings to be tracked, wherein for allocation of the determined offset values to a respective one of the separate courses of the lane markings to be tracked, a parametric estimation method is applied; and
   f) outputting a lane-departure-warning in accordance with the offset values.

2. The method according to claim 1, wherein separate courses are estimated for exactly two of the lane markings to be tracked, wherein the allocation of the determined offset values to a respective one of the two separate courses is indicated by a set of binary parameters.

3. The method according to claim 2, wherein the set of binary parameters can be used for parameterization of a model curve approximately describing the course of the lane.

4. The method according to claim 2, wherein given combinations of values of the set of binary parameters are used as input variables for generating additional estimation hypotheses.

5. The method according to claim 4, wherein the tracking process is performed separately for several different hypotheses and following a predetermined number of computing cycles, a most likely hypothesis is determined for which a deviation between the estimated courses of lane markings to be tracked and the courses of recognized lane markings is least.

6. The method according to claim 5, wherein only two tracking processes for different hypotheses are performed simultaneously in single comparison steps, respectively.

7. The method according to claim 6, wherein starting with an arbitrary start hypothesis several single comparison steps are carried out successively, wherein the most likely hypothesis of a previous single comparison step is respectively compared with a hypothesis not yet subjected to a single comparison step.

8. The method according to one of claim 4, wherein for every generated hypothesis a separate allocation of measurement values to the lane markings is performed using the Hungarian method.

9. The method according to claim 1, wherein respective offset values are determined for at least four recognized lane markings.

10. The method according to claim 1, wherein a test is made before performing the additional estimation method when for each separately estimated course at least one or two offset values are determinable, wherein otherwise the state estimator is limited by means of a logic based on the number of offset values.

11. The method according to claim 1, wherein the state estimator uses a state vector whose components comprise course parameters for each of the lane markings to be tracked and additionally several offset parameters formed by the offset values, wherein, preferably, the state estimator uses a state vector whose components additionally include an angular offset of the vehicle relative to one of the two separate courses, an angular offset of the vehicle relative to the other of the two separate courses, an angle of inclination of the road surface plane relative to an average road surface plane and/or a lateral speed of the vehicle.

12. The method according to claim 1, wherein the reference axis coincides with the center longitudinal axis of the vehicle or with its vertical projection on the road surface plane and the offset values each indicate a transverse offset of a lane marking in the road surface plane.

13. The method according to claim 1, wherein only those two lane markings are subjected to the tracking process which correspond to a left and a right lane boundary of the own-lane driven on by the vehicle.

* * * * *